United States Patent
Christopher et al.

(10) Patent No.: US 10,274,917 B2
(45) Date of Patent: Apr. 30, 2019

(54) SYSTEM AND METHOD FOR REGULATING ILLUMINATION AND TEMPERATURE LEVEL THROUGH INTERNET OF THINGS (IOT) DEVICE

(71) Applicant: AMERICAN MEGATRENDS, INC., Norcross, GA (US)

(72) Inventors: Samvinesh Christopher, Suwanee, GA (US); Joseprabu Inbaraj, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 242 days.

(21) Appl. No.: 15/174,415

(22) Filed: Jun. 6, 2016

(65) Prior Publication Data

US 2017/0350612 A1    Dec. 7, 2017

(51) Int. Cl.
 *F24F 11/58* (2018.01)
 *G05B 19/042* (2006.01)
 *G05B 15/02* (2006.01)
 *F24F 11/30* (2018.01)

(52) U.S. Cl.
 CPC .......... *G05B 19/042* (2013.01); *G05B 15/02* (2013.01); *F24F 11/30* (2018.01); *F24F 11/58* (2018.01); *G05B 2219/2614* (2013.01); *G05B 2219/31156* (2013.01)

(58) Field of Classification Search
 CPC . G05B 19/042; G05B 2219/2614; F24F 11/30
 USPC .................................................. 700/276, 237
 See application file for complete search history.

(56) References Cited

U.S. PATENT DOCUMENTS

| | | | |
|---|---|---|---|
| 9,552,684 B2* | 1/2017 | Bacco | G07C 9/00158 |
| 2012/0253522 A1* | 10/2012 | Kobayashi | F24F 11/0034 |
| | | | 700/276 |
| 2014/0107846 A1* | 4/2014 | Li | H04W 4/04 |
| | | | 700/275 |
| 2016/0239001 A1* | 8/2016 | Chin | G05B 15/02 |

* cited by examiner

*Primary Examiner* — Robert E Fennema
*Assistant Examiner* — Marzia T Monty
(74) *Attorney, Agent, or Firm* — Locke Lord LLP; Tim Tingkang Xia, Esq.

(57) ABSTRACT

Aspects direct to systems and methods for regulating illumination and temperature levels in a designated area. The system includes an internet of things (IoT) based entrance having an IoT device. The IoT device receives authentication information from an identification device, and authenticates the identification device. In response to determining the identification device to be authenticated, the IoT device controls the IoT based entrance to grant access to the user of the identification device. The IoT device also generates personnel access information of the user, and updates personnel information corresponding to the designated area using the personnel access information of the user. Then the IoT device may control lighting and heating/cooling systems based on the personnel information corresponding to the designated area and lighting and temperature rules. The personnel information corresponding to the designated area may include a total number of authenticated users physically located within the designated area.

22 Claims, 7 Drawing Sheets

| Identification Device | Preferred Illumination Level | Preferred Temperature Level |
|---|---|---|
| D1 | 2-5 | 68-72 °F |
| D2 | 3-6 | 70-73 °F |
| D3 | 4-5 | 69-71 °F |
| D4 | 3-8 | 70-72 °F |

| Identification Device | Preferred Illumination Level | Preferred Temperature Level |
|---|---|---|
| D1 | 2-5 09:00-17:00<br>4-8 17:00-21:00 | 68-72 °F 09:00-21:00 |
| D2 | 3-6 09:00-17:00<br>5-8 17:00-21:00 | 70-73 °F 09:00-21:00 |
| D3 | 4-5 09:00-21:00 | 69-71 °F 09:00-17:00<br>71-73 °F 17:00-21:00 |
| D4 | 3-8 09:00-17:00 | 69-72 °F 09:00-17:00 |

SYSTEM AND METHOD FOR REGULATING ILLUMINATION AND TEMPERATURE LEVEL THROUGH INTERNET OF THINGS (IOT) DEVICE

FIELD

The present disclosure relates generally to internet of things (IoT) technology, and more particularly to systems and methods for regulating illumination and temperature levels in an area according to personnel composition through IoT devices in order to reduce carbon foot print.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In most office buildings, lighting and heating/cooling systems constantly run all day, even during nights and weekends when no one is generally present. This causes unnecessary electricity and gas usage, which increases the cost of operation and the carbon foot prints of the offices.

Therefore, an unaddressed need exists in the art to address the aforementioned deficiencies and inadequacies.

SUMMARY

Certain aspects of the disclosure direct to a system, which includes at least one internet of things (IoT) based entrance for a designated area. In certain embodiments, each of the at least one IoT based entrance includes an IoT device, and the IoT device includes a processor and a storage device storing computer executable code. In certain embodiments, the computer executable code, when executed at the processor, is configured to: receive, from an identification device through a wireless network, authentication information of a user of the identification device; determine, based on the authentication information, whether the identification device is authenticated; and in response to determining the identification device to be authenticated, control the IoT based entrance to grant access to the user of the identification device; generate personnel access information of the user; update personnel information corresponding to the designated area using the personnel access information of the user; and control a lighting system and a heating/cooling system based on the personnel information corresponding to the designated area and lighting and temperature rules.

In certain embodiments, the personnel information corresponding to the designated area includes a total number of authenticated users physically located within the designated area.

In certain embodiments, the personnel information corresponding to the designated area further includes identity information of each of the authenticated users physically located within the designated area.

In certain embodiments, the lighting and temperature rules include the preferred illumination level and preferred temperature level for each of the authenticated users.

In certain embodiments, the computer executable code is configured to control the lighting system and the heating/cooling system by: retrieving the identity information of each of the authenticated users physically located within the designated area; retrieving, based on the identity information of each of the authenticated users, the preferred illumination level and preferred temperature level for each of the authenticated users; and calculating an overall illumination level and an overall temperature level for the designated area as the lighting and temperature rules.

In certain embodiments, the system further includes at least one server to control the lighting system and the heating/cooling system, where the computer executable code is configured to control the lighting system and the heating/cooling system by: generating control signals based on the personnel information corresponding to the designated area and the lighting and temperature rules; and sending the control signals to the at least one server to control the lighting system and the heating/cooling system.

In certain embodiments, the IoT device is communicatively connected to the at least one server through a network independent and separate from the wireless network.

In certain embodiments, the computer executable code includes: a data store storing the personnel information corresponding to the designated area and the lighting and temperature rules; an authentication module configured to determine, based on the authentication information, whether the identification device is authenticated; an entrance control module configured to, when the identification device is authenticated, control the IoT based entrance to grant access to the user of the identification device; a personnel information processing module configured to: when the identification device is authenticated, generate the personnel access information of the user; and update the personnel information corresponding to the designated area using the personnel access information of the user; and a server control module configured to: retrieve the personnel information corresponding to the designated area and the lighting and temperature rules from the data store; and generate, based on the personnel information corresponding to the designated area and the lighting and temperature rules, control signals, and send the control signals to at least one server to control the lighting system and the heating/cooling system.

In certain embodiments, the data store further stores authentication data of each of the authenticated users, and the authentication module is configured to: receive, from the identification device through the wireless network, the authentication information of the user of the identification device; compare the authentication information of the user of the identification device to the authentication data of each of the authenticated users; and when the authentication information of the user of the identification device matches one of the authentication data of each of the authenticated users, determine the identification device to be authenticated.

Certain aspects of the disclosure direct to a method for regulating illumination and temperature levels in a designated area according to personnel composition. In certain embodiments, the method includes: receiving, by an IoT device of at least one IoT based entrance for the designated area, authentication information of a user of an identification device through a wireless network; determining, by the IoT device based on the authentication information, whether the identification device is authenticated; and in response to determining the identification device to be authenticated, controlling, by the IoT device, the IoT based entrance to grant access to the user of the identification device; generating, by the IoT device, personnel access information of the user; updating, by the IoT device, personnel information corresponding to the designated area using the personnel access information of the user; and controlling, by the IoT device, a lighting system and a heating/cooling system based on the personnel information corresponding to the designated area and lighting and temperature rules.

In certain embodiments, the personnel information corresponding to the designated area includes a total number of authenticated users physically located within the designated area.

In certain embodiments, the personnel information corresponding to the designated area further includes identity information of each of the authenticated users physically located within the designated area. In certain embodiments, the lighting and temperature rules include the preferred illumination level and preferred temperature level for each of the authenticated users.

In certain embodiments, the IoT device is configured to control the lighting system and the heating/cooling system by: retrieving the identity information of each of the authenticated users physically located within the designated area; retrieving, based on the identity information of each of the authenticated users, the preferred illumination level and preferred temperature level for each of the authenticated users; and calculating an overall illumination level and an overall temperature level for the designated area as the lighting and temperature rules.

In certain embodiments, the system further includes at least one server to control the lighting system and the heating/cooling system, where the IoT device is configured to control the lighting system and the heating/cooling system by: generating control signals based on the personnel information corresponding to the designated area and the lighting and temperature rules; and sending the control signals to the at least one server to control the lighting system and the heating/cooling system.

In certain embodiments, the IoT device is communicatively connected to the at least one server through a network independent and separate from the wireless network.

Certain aspects of the disclosure direct to a non-transitory computer readable medium storing computer executable code. In certain embodiments, the computer executable code, when executed at a processor of an IoT device of at least one IoT based entrance for a designated area, is configured to: receive, from an identification device through a wireless network, authentication information of a user of the identification device; determine, based on the authentication information, whether the identification device is authenticated; and in response to determining the identification device to be authenticated, control the IoT based entrance to grant access to the user of the identification device; generate personnel access information of the user; update personnel information corresponding to the designated area using the personnel access information of the user; and control a lighting system and a heating/cooling system based on the personnel information corresponding to the designated area and lighting and temperature rules.

In certain embodiments, the personnel information corresponding to the designated area includes a total number of authenticated users physically located within the designated area.

In certain embodiments, the personnel information corresponding to the designated area further includes identity information of each of the authenticated users physically located within the designated area. In certain embodiments, the lighting and temperature rules include the preferred illumination level and preferred temperature level for each of the authenticated users.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems applied on IoT devices. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable codes or instructions that are stored on a non-transitory tangible computer readable medium. The computer programs may also include stored data. Non-limiting examples of the non-transitory tangible computer readable medium are nonvolatile memory, magnetic storage, and optical storage.

Certain aspects of the present disclosure direct to systems and methods for regulating illumination or air conditioning temperature in a designated area through IoT devices. As discussed above, an illumination or air conditioning system typically controls and maintains the illumination or temperature level of a designated area to be within a certain range. However, personnel staying in the designated area may vary, and various personnel may have different preferences for the illumination or temperature level. Hence, maintaining the illumination or temperature level in the designated area to be within the default fixed range without considering variation of personnel staying in the designated area does not serve the exact need of the personnel staying in the designated area, and thus can lead to inefficient energy usage especially when the personnel in the area prefer a lower illumination level or out-of-default-range temperature level. Accordingly, certain embodiments of the present disclosure provide systems and methods to implement a software-implemented IoT system interface to fulfill the need for controlling the illumination or temperature range according to the preferences of personnel staying in the designated area.

In certain embodiments, the IoT system and method requires the following items for implementation: (1) figuring out the occupants inside the designated area (such as a building, an office area, or any other secured designated area); (2) controlling all lighting systems by a central system or switch, which may be controlled remotely; and (3) controlling air conditioning systems (such as HVAC units) by a central system to reduce the heating/cooling energy output. In certain embodiments, most office buildings have entrance/exit doors equipped with security means, such as locks which may be unlocked or activated using an identification device, such as an employee badge. These security means and identification devices are provided for security purposes as well as employee time punch clocks. In such systems, the exact number of the occupants in the office area may be obtained. The method may require periodically monitoring of this count. In certain embodiments, when the count becomes zero (last person leaving the office), the lighting and heating/cooling systems should be switched off, or be set to minimal operation in response to extreme climate conditions such that the amount of energy needed to bring back the general setting is not costly. When the first person arrives in the office, the count becomes non-zero (e.g., 1), and the lighting and heating/cooling systems should automatically turned on and set to the predetermined lighting and temperature levels.

Figure 1:
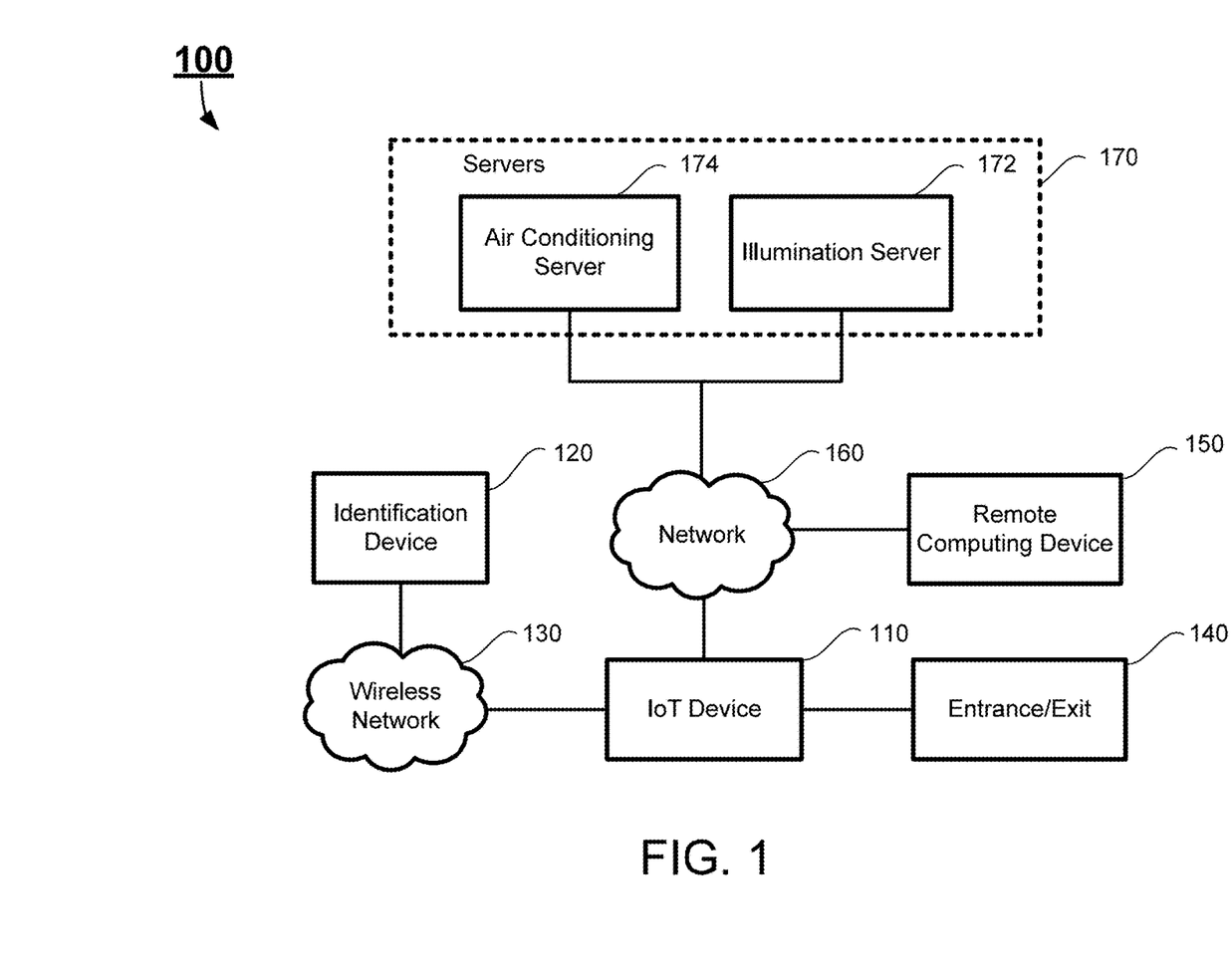
FIG. 1 schematically depicts an exemplary system according to certain embodiments of the present disclosure.

FIG. 1 schematically depicts an exemplary system according to certain embodiments of the present disclosure. As shown in FIG. 1, the system 100 includes an IoT device 110, an identification device 120, an entrance/exit 140, a remote computing device 150, and a plurality of servers 170, including an illumination server 172 and an air conditioning server 174. The IoT device 110 and the entrance/exit 140 collectively form an IoT based entrance for a designated area, which may be an enclosed and secured area. The IoT device 110 and the identification device 120 are communicatively interconnected via a wireless network 130. In certain embodiments, the wireless network 130 may be a Bluetooth network under the Bluetooth protocol, which enables communications between the IoT device 110 and the identification device 120 through Bluetooth connections. In certain embodiments, the wireless network 130 may be any wireless networks under different wireless protocols, which enable communications between the IoT device 110 and the identification device 120 through wireless connections. Further, the IoT device 110, the remote computing device 150 and the servers 170 may be communicatively interconnected via a network 160. In certain embodiments, the network 160 may be an independent and separate network from the wireless network 130. In certain embodiments, the network 160 may be wired or wireless network, and may be of various forms. Examples of the network 160 may include, but is not limited to, a local area network (LAN) or wide area network (WAN) including the Internet. In certain embodiments, the identification device 120 may also be connected to the network 160. Further, additional different networks may be applied to interconnect the IoT device 110, the identification device 120, the remote computing device 150 and the servers 170.

The entrance/exit 140 is a movable structure that may be used to block off or allow access to a passage to enter into (or to leave from) the designated area. Generally, the designated area may be an enclosed and secured area, such as a building, an office area, a hospital, a vehicle, or any other enclosed area that a person who attempts to access to the area through the entrance/exit 140 must have permission to do so. For the person to obtain permission to access the secured area through the entrance/exit 140, the person must be an authenticated user of an identification device 120, who may pass an authentication process with the IoT device 110. In certain embodiments, the entrance/exit 140 may be implemented by a door, a gate, or any other structure with security means that may be used to block off or allow access to the secured area, with a default status of the entrance/exit 140 being a block status. For example, the entrance/exit 140 may be an automatic door which is control by the IoT device 110 to open or close, and the default status of the automatic door is closed. Alternatively, the entrance/exit 140 may be a door which is control by the IoT device 110 to be locked or unlocked, and the default status of the door is locked.

The IoT device 110 is a device with IoT functionalities, which communicates with the identification device 120 and controls the entrance/exit 140 based on authorization to the identification device 120. The IoT device 110 also communicate with the servers 170 to control the lighting and the heating cooling systems based on the personnel information corresponding to the designated area. In certain embodiments, the IoT device 110 may be communicatively connected to the entrance/exit 140 through an interface, which enables the IoT device 110 to transmit a control signal to the entrance/exit 140, in order to grant or deny access to the secured area through the entrance/exit 140. In certain embodiments, the IoT device 110 may be located in or on the entrance/exit 140, as a part of the entrance/exit 140, or near the entrance/exit 140.

Figure 2:
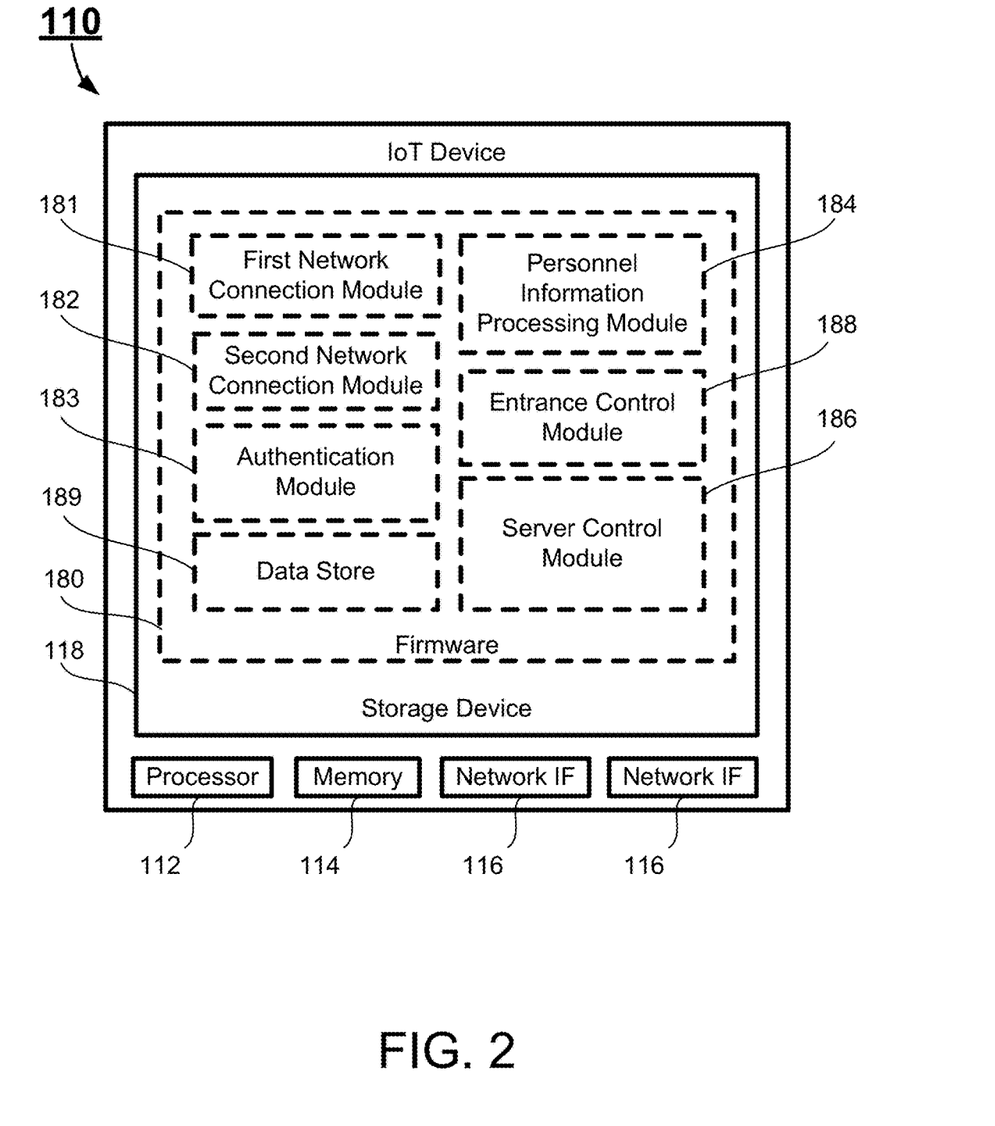
FIG. 2 schematically depicts an exemplary IoT device of the system according to certain embodiments of the present disclosure.

FIG. 2 schematically depicts an exemplary IoT device 110 of the system according to certain embodiments of the present disclosure. In certain embodiments, the IoT device 110 may include necessary hardware and software components to perform certain predetermined tasks, such as communication with the identification device 120 and controlling the entrance/exit 140. As shown in FIG. 2, the IoT device 110 includes a processor 112, a memory 114, a plurality of network interfaces 116, and a storage device 118. Further, the IoT device 110 may include other hardware components and software components (not shown) to perform its corresponding tasks. Examples of these hardware and software components may include, but not limited to, other required memory, interfaces, buses, Input/Output (I/O) modules and peripheral devices.

The processor 112 is configured to control operation of the IoT device 110. In certain embodiments, the processor 112 may be a central processing unit (CPU). The processor 112 can execute any computer executable code or instructions, such as the firmware 180 of the IoT 110 or other applications and instructions of the IoT device 110. In certain embodiments, the IoT device 110 may run on more than one processor, such as two processors, four processors, eight processors, or any suitable number of processors.

The memory 114 can be a volatile memory, such as the random-access memory (RAM), for storing the data and information during the operation of the IoT device 110. In certain embodiments, the memory 114 may be a volatile memory array. In certain embodiments, the IoT device 110 may run on more than one memory 114.

The network interfaces 116 are interfaces that connect the IoT device 110 to the wireless network 130 and/or the network 160. In certain embodiments, each of the network interfaces 116 may be dedicated to one of the wireless network 130 and the network 160. For example, as shown in FIG. 2, two network interfaces 116 are provided. When the wireless network 130 is a Bluetooth network, one of the network interfaces 116 may be a Bluetooth interface, which is dedicated to connecting the IoT device 110 to the Bluetooth network; and the other network interface 116 may be dedicated to connecting the IoT device 110 to the network 130. In certain embodiments, each of the network interfaces 116 may be implemented by a network interface card (NIC). It should be noted that the IoT device 110 may include more than two different network interfaces if the IoT device 110 is connected to more than two different types of network. In certain embodiments, the number of network interfaces 116 of the IoT device 110 may be determined based on the networks provided by the system 110. In other words, when the system 100 includes additional network for the IoT device 110 to connect to, the IoT device 110 may include more network interfaces to perform network communication with the additional network.

The storage device 118 is a non-volatile data storage media for storing the applications of the IoT device 110, such as the firmware 180. Examples of the storage device 118 may include non-volatile memory such as flash memory, memory cards, USB drives, hard drives, floppy disks, optical drives, or any other types of data storage devices. In certain embodiments, the IoT device 110 may have multiple storage devices 118, which may be identical storage devices or different types of storage devices, and the firmware 180 and other applications of the IoT device 110 may be stored in one or more of the storage devices 118 of the IoT device 110.

The firmware 180 of the IoT device 110 may include a plurality of firmware modules, which may be implemented by computer executable codes or instructions to collectively form the firmware 180. As shown in FIG. 2, the firmware 180 includes, among other things, a first network connection module 181, a second network connection module 182, an authentication module 183, a personnel information processing module 184, a server control module 186, an entrance control module 188, and a data store 189. In certain embodiments, the firmware 180 may include other applications necessary for the operation of the IoT device 110. In certain embodiments, each of the modules may further include sub-modules. Alternatively, some or all of the modules may be combined as one module.

The first network connection module 181 controls the communication through one of the network interfaces 116 dedicated to the wireless network 130. In certain embodiments, when the IoT device 110 receives a signal through the wireless network 130, the first network connection module 181 receives the signal and sends the signal to a corresponding module (e.g., the authentication module 183) to process the signal.

The second network connection module 182 controls the communication through the network interface 116 dedicated to the network 160. For example, when the network 160 is a Wi-Fi network, the second network connection module 182 may be a module under the Wi-Fi protocol to control the network interface 116 to communicate with the Wi-Fi network. In certain embodiments, when the IoT device 110 receives a signal through the network 160, the second network connection module 182 receives the signal and sends the signal to a corresponding module (e.g., the authentication module 183 or the server control module 186) to process the signal. In certain embodiments, when the second network connection module 182 receives a command from a module (e.g., the authentication module 183, the personnel information processing module 184 or the server control module 186) to send out a signal through the network 160, the second network connection module 182 constructs the signal based on the command and sends out the signal to the network 160 through the network interface 116.

The authentication module 183 is configured to perform an authentication process. In certain embodiments, when the first network connection module 181 receives a communication signal from the identification device 120 through the wireless network 130 for authentication purposes, the first network connection module 181 forwards the communication signal to the authentication module 183. The communication signal may include authentication information for the authentication module 183 to determine whether the identification device 120 (which represents its holder, who may be an authenticated user or an unauthenticated user) is authenticated. In receiving the communication signal, the authentication module 183 may retrieve the authentication information from the communication signal, and determine whether the identification device 120 is authenticated based on the authentication information. When an identification device 120 is successfully authenticated, the authentication module 183 controls the entrance control module 188 to grant access to the entrance/exit 140. Meanwhile, the authentication module 183 also controls the personnel information processing module 184 to update the personnel information stored in the data store 189.

The personnel information processing module 184 is a module to update the personnel information corresponding to the designated area, which is stored in the data store 189. In particular, the personnel information corresponding to the designated area is a collection of the personnel access information of each authenticated user. In certain embodiments, when the authentication module 183 performs the authentication process and successfully authenticates an identification device 120, the authentication module 183 may send corresponding personnel access information of the authenticated user (i.e., the identification device 120) to the personnel information processing module 184. In response to receiving the personnel access information, the personnel information processing module 184 may update the personnel information stored in the data store 189.

The server control module 186 is configured to control the servers 170, including the illumination server 172 and the air conditioning server 174. In operation, the server control module 186 may retrieve the personnel information and lighting and temperature rules stored in the data store 189, and then determine corresponding lighting and temperature conditions of the designated area based on the personnel information corresponding to the designated area and the lighting and temperature rules. Based on the lighting and temperature conditions, the server control module 186 may generate control signals to control the lighting and heating/cooling systems for the designated area, and send the control signals to the second network connection module 182, such that the second network connection module 182 may send the control signals to the servers 170 through the network 160.

The entrance control module 188 is a module to control the entrance/exit 140. As discussed above, the entrance/exit 140 may be implemented by a door, a gate, or any other structure with security means that may be used to block off or allow access to the secured area, with a default status of the entrance/exit 140 being a block status. When the authentication module 183 performs the authentication process and successfully authenticates an identification device 120, the entrance control module 188 may send a control signal to the entrance/exit 140 to unblock the entrance/exit 140, such as opening or unlocking the entrance/exit 140, in order to grant access to the user of the identification device 120 to enter (or to leave from) the secured area through the entrance/exit 140. For example, the entrance control module 188 may control a servo motor or any other driving device of the entrance/exit 140, which enables the opening and/or closing of the entrance/exit 140. In certain embodiments, the access being granted to the user of the identification device 120 will last for a certain period of time to allow the authenticated user to enter (or to leave from) the secured area through the entrance/exit 140. Once the period of time is up, the entrance control module 188 may send a control signal to the entrance/exit 140 to block the entrance/exit 140, such that the entrance/exit 140 returns to the default block status.

The data store 189 is a database which stores the personnel information corresponding to the designated area, the lighting and temperature rules, the data for the authentication process, and other necessary data of the firmware 180. In certain embodiments, the data stored in the data store 189 may include, without being limited to, the personnel information, the lighting and temperature rules, and authentication data for the authenticated identification devices. In certain embodiments, each of the authenticated wireless addresses of the authenticated identification devices may be a Bluetooth address of the identification device 120. It should be noted that, although the data store 189 is illustrated in FIG. 2 as a single block, the actual data stored in the data store 189 may be distributed in different locations of the storage device 118. In certain embodiments, when the IoT device 110 includes multiple storage devices 118, the actual data stored in the data store 189 may be distributed among the multiple storage devices 118. In certain embodiments, the data stored in the data store 189 may include other information, such as administrative information, a log for all successful and failed attempts to access the entrance/exit 140, and other information necessary for the operation of the IoT device 120.

In certain embodiments, the operation of the IoT device 110 may be described in details as below. When the first network connection module 181 of the IoT device 110 receives a communication signal from an identification device 120 through the wireless network 130, the first network connection module 181 sends the communication signal to the authentication module 183 to perform the authentication process. The authentication module 183 then determines whether the identification device 120 is authenticated based on the information contained in the communication signal. In certain embodiments, the authentication module 183 may retrieve the authentication information from the communication signal, and then determine whether the identification device 120 is authenticated based on the authentication information. When the authentication module 183 successfully authenticates an identification device 120, the authentication module 183 controls the entrance control module 188 to grant access to the entrance/exit 140. Meanwhile, the authentication module 183 also controls the personnel information processing module 184 to update the personnel information stored in the data store 189. Once the personnel information in the data store 189 is updated, the server control module 186 may determine the corresponding lighting and temperature conditions of the designated area based on the personnel information and the lighting and temperature rules, and then generate control signals for the servers 170 to control the lighting and heating/cooling systems for the designated area. The second network connection module 182 may then transmit the control signals to the servers 170 through the network 130.

The identification device 120 is a device used by its corresponding user (i.e., a person) for authentication purposes. Specifically, when a person has the permission to access the designated secured area through the entrance/exit 140, the person is an authenticated user, and the identification device 120 may function to identify the person to be granted access to the secured area through the entrance/exit 140 by the authentication process. In certain embodiments, when multiple authenticated users are allowed to access the secured area, the system 100 may include a plurality of identification devices 120, and each authenticated user may have a unique corresponding identification device 120 to identify its corresponding user. In certain embodiments, the identification device 120 may be a badge, an identification card, or a tag storing information of the authenticated user, which may be transmitted to or detected by the IoT device 110. In certain embodiments, the identification device 120 may be a more complex electronic device that has wireless (e.g. Bluetooth or other communication protocol) communication capabilities to enable communication with the IoT device 110. For example, the identification device 120 may be a mobile device, such as a smartphone, a tablet, or any other type of mobile device that has Bluetooth communication capabilities to enable communication with the IoT device 110. In certain embodiments, the identification device 120 may be located within a range of the IoT device 110 such that the communication with the IoT device 110 through the wireless network 130 may be established.

The remote computing device 150 is a computing device which may be communicatively connected to the IoT device 110 through the network 160. In certain embodiments, the remote computing device 150 functions as a server, which may provide necessary application and/or data for the IoT device 110. For example, the remote computing device 150 may include a database, which collects the information stored in the data store 189 of the IoT device 110 through the network 160 for log and backup purposes. In certain embodiments, the administrator of the system 100 may use the remote computing device 150 to remotely control or configure the IoT device 110. Optionally, in certain embodiments, the identification device 120 may also be connected to the network 160, and the remote computing device 150 may provide necessary application and/or data for the identification device 120. For example, identification device 120 may be a mobile device, and the authentication process may utilize an authentication application (hereinafter the app) being installed on the mobile device. Thus, an authenticated user may use the identification device 120 to download the app from the remote computing device 150 through the network 160.

The servers 170 include the illumination server 172 and the air conditioning server 174. The illumination server 172 controls the lighting system for the designated area, and the air conditioning server 174 controls the heating/cooling system for the designated area. In certain embodiments, the illumination server 172 may control the lighting system to turn on or turn off the light, and to adjust the illumination level of the designated area when the light is on. Similarly, the air conditioning server 174 may control the heating/cooling system for the designated area to turn on or turn off, and to adjust the temperature level of the designated area when the heating/cooling system is on. It should be particularly noted that the illumination server 172 and the air conditioning server 174 may be each implemented by one or more computing devices, or may be combined in one computing device. In certain embodiments, the remote computing device 150 may function as one or more of the servers 170.

It should be particularly noted that the personnel information corresponding to the designated area may include personnel access information of each authenticated user entering or leaving the designated area. In certain embodiments, a simple way to manage the personnel access information for each authenticated user is to use a counter to count the authenticated access through the IoT based entrance (i.e., the IoT device 110 and the entrance/exit 140). For example, a default counter status of each authenticated user may be set to zero, which indicates that the authenticated user is out of the designated area. When the authenticated user uses the identification device 120 to communicate with the IoT device 110, the authentication module 183 will successfully authenticate the identification device 120. Thus, the personnel module 184 will update the personnel access information corresponding to the authenticated user by adding 1 to the counter of the authenticated user. If the number of the counter is an odd number (1, 3, 5, 7, . . . ), the authenticated user is in the designated area, and if the number of the counter is an even number (0, 2, 4, 6, . . . ), the authenticated user is out of the designated area.

Figure 3:
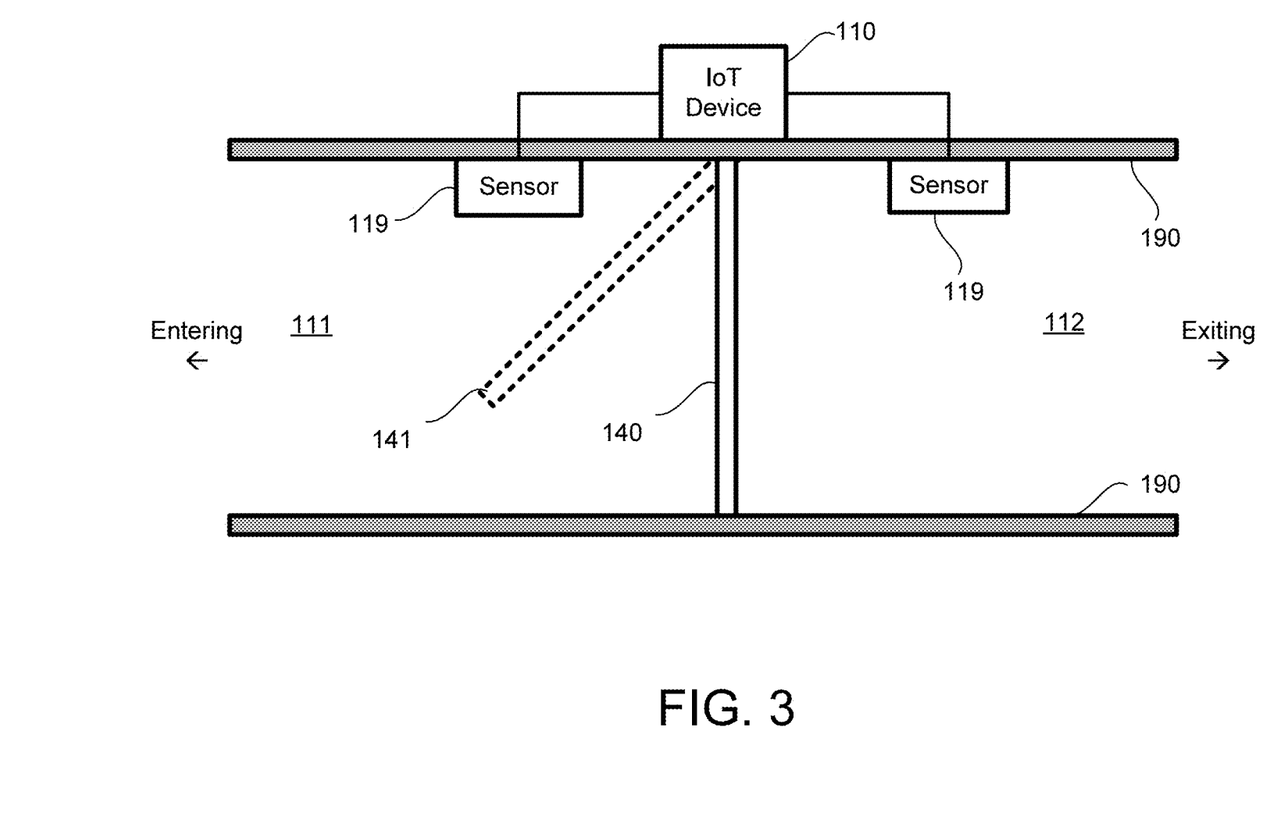
FIG. 3 schematically depicts an exemplary mechanism of the IoT device according to certain embodiments of the present disclosure.

In certain embodiments, the IoT device 110 may be configured in a more complex way to implement a more secured authentication process. FIG. 3 schematically depicts an exemplary mechanism of the IoT device according to certain embodiments of the present disclosure. As shown in FIG. 3, the entrance/exit 140 is implemented as a door between two walls 190, which divides the secured designated area 111 from an outside area 112. The door may be controlled by the IoT device 110 to turn to a position 141 in order to grant access to the designated area 111. In addition, the IoT device 110 further includes two sensors 119 for detecting the identification device 120. One of the two sensors 119 is located in the secured area 111, and the other of the two sensors 119 is located in the outside area 112.

In operation, the sensors 119 may be used for identifying an moving direction of the identification device 120 being entering or leaving the designated area, as shown in FIG. 3 as "entering" arrow and "exiting" arrow, respectively. In this case, the IoT device 110 may determine whether the authenticated user of the identification device 120 is entering or leaving the designated area based on the sensor signal received. For example, when an authenticated user is in the outside area 112 and attempts to enter the designated area 111, the identification device 120 of the authenticated user would only be detected to the sensor 119 located in the outside area 112, since the sensor 119 located in the designated area 111 is blocked by the door 140. Thus, when the IoT device 110 receives the communication signal detected by the sensor 119 located in the outside area 112, the personnel information processing module 184 of the IoT device 110 may determine that the authenticated user is entering the designated area 111. Similarly, when an authenticated user is in the designated area 111 and attempts to leave the designated area 111, the identification device 120 of the authenticated user would only be detected to the sensor 119 located in the designated area 111, since the sensor 119 located in the outside area 112 is blocked by the door 140. Thus, when the IoT device 110 receives the communication signal detected by the sensor 119 located in the designated area 111, the personnel information processing module 184 of the IoT device 110 may determine that the authenticated user is leaving the designated area 111. Accordingly, the personnel information processing module 184 may determine the location of the authenticated user more accurately.

In certain embodiments, the lighting and temperature rules stored in the data store 189 may include rules for the server control module to determine the control signals for the servers 170. In certain embodiments, the lighting and temperature rules may include simple rules, such as turning on the lighting system and/or the heating/cooling system when the number of people in the designated area is not zero, and turning off the lighting system and/or the heating/cooling system when the number of people in the designated area is zero. In certain embodiments, the lighting and temperature rules may include more complex rules in different level, such as controlling the illumination level of the lighting system and/or the temperature level of the heating/cooling system based on the total number of people in the designated area. In this case, the personnel information corresponding to the designated area may include a total number of the users physically located within the designated area.

In certain embodiments, the lighting and temperature rules may include more complex rules customized based on the identity of each person in the designated area. For example, in an office area, each person may have his or her preferred illumination level and preferred temperature level to feel comfortable. Thus, the data store 189 may store the data of the preferred illumination level and preferred temperature level for each authenticated user as information for the lighting and temperature rules. Further, the data store 189 may store the identity information of each of the users physically located within the designated area as the personnel information corresponding to the designated area. Accordingly, the lighting and temperature rules may be determined by calculating the overlapping preferred illumination level and preferred temperature level based on the identities of the people in the designated area in order to obtain an overall illumination level and an overall temperature level for the designated area as the lighting and temperature rules.

Figure 4:
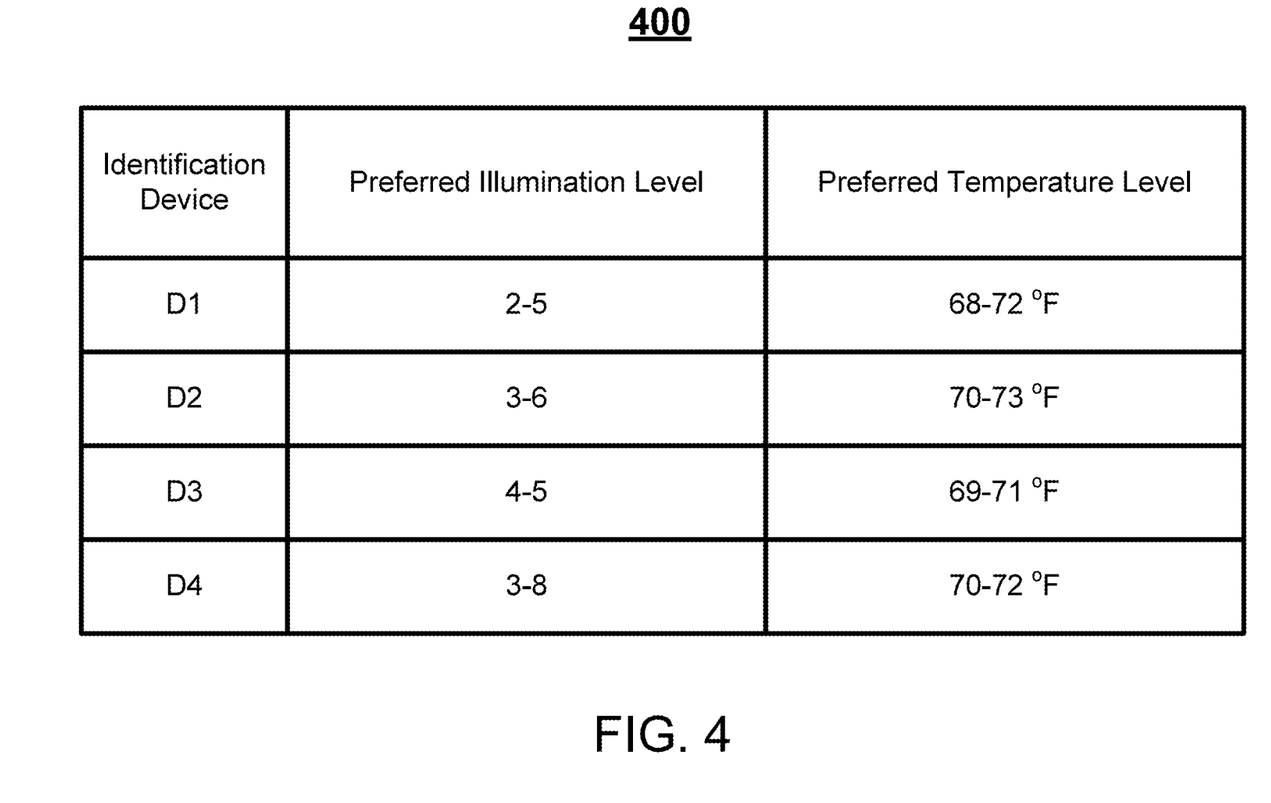
FIG. 4 depicts a table of the lighting and temperature rules according to certain embodiments of the present disclosure.

FIG. 4 depicts a table of the lighting and temperature rules according to certain embodiments of the present disclosure. As shown in FIG. 4, four identification devices 120 are listed as D1 to D4, and each of the identification devices 120 has a corresponding preferred illumination level and preferred temperature level for its authenticated user. For example, for the identification device D1, the preferred illumination level is 2-5, and the preferred temperature level is 68-72° F. For the identification device D2, the preferred illumination level is 3-6, and the preferred temperature level is 70-73° F. For the identification device D3, the preferred illumination level is 4-5, and the preferred temperature level is 69-71° F. For the identification device D4, the preferred illumination level is 3-8, and the preferred temperature level is 70-72° F. Thus, when all four users of the identification devices D1 to D4 are present in the designated area, the preferred illumination level may become 4-5, and the preferred temperature level may be 70-71° F. If only the users of the identification devices D1 and D2 are present in the designated area, the preferred illumination level may be 3-5, and the preferred temperature level may be 70-72° F. In this way, the server control module 186 may determine the lighting and temperature rules by calculating the preferred illumination level and preferred temperature level based on the identities of the people in the designated area.

Figure 5:
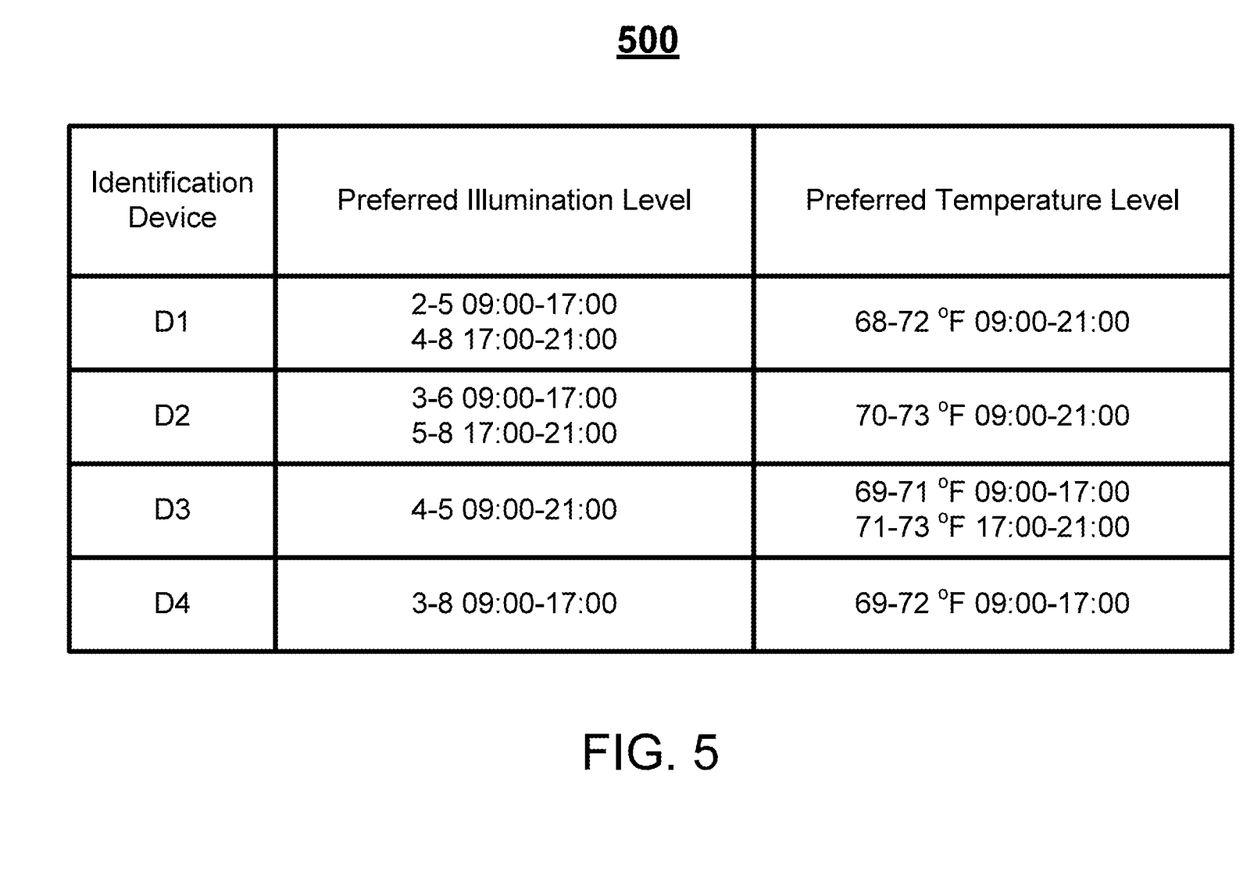
FIG. 5 depicts a table of the lighting and temperature rules according to certain embodiments of the present disclosure.

FIG. 5 depicts a table of the lighting and temperature rules according to certain embodiments of the present disclosure. As shown in FIG. 5, four identification devices 120 are listed as D1 to D4, and each of the identification devices 120 has one or two corresponding preferred illumination levels and preferred temperature levels for its authenticated user. For example, for the identification device D1, during the office hour time between 09:00-17:00, the preferred illumination level is 2-5, and the preferred temperature level is 68-72° F.; and during the evening time between 17:00-21:00, the preferred illumination level is 4-8, and the preferred temperature level is 68-72° F. (which is the same temperature level to that at the office hour time). For the identification device D2, during the office hour time between 09:00-17:00, the preferred illumination level is 3-6, and the preferred temperature level is 70-73° F.; and during the evening time between 17:00-21:00, the preferred illumination level is 5-8, and the preferred temperature level is 70-73° F. (which is the same temperature level to that at the office hour time). For the identification device D3, during the office hour time between 09:00-17:00, the preferred illumination level is 4-5, and the preferred temperature level is 69-71° F.; and during the evening time between 17:00-21:00, the preferred illumination level is 4-5 (which is the same illumination level to that at the office hour time), and the preferred temperature level is 71-73° F. For the identification device D4, only one set of range is listed for the office hour time (i.e., the user of the identification device D4 may not be authenticated to access the office area during evening), the preferred illumination level is 3-8, and the preferred temperature level is 70-72° F. Thus, when all four users of the identification devices D1 to D4 are present in the designated area during the office hour time, the preferred illumination level may become 4-5, and the preferred temperature level may be 70-71° F. If only the users of the identification devices D1 and D2 are present in the designated area during the evening, the preferred illumination level may become 5-8, and the preferred temperature level may be 70-72° F. In this way, the server control module 186 may determine the lighting and temperature rules by calculating the preferred illumination level and preferred temperature level based on the identities of the people in the designated area.

In certain embodiments, the lighting and temperature rules may include further details based on the nature of the designated area. For example, in certain embodiments, the designated area may be further divided into multiple sub-areas, and each sub-area may have corresponding lighting systems. In this case, the lighting and temperature rules may further include lighting rules corresponding to each sub-area based on the accessibility of each sub-area by the authenticated users in the designated area.

Figure 6:
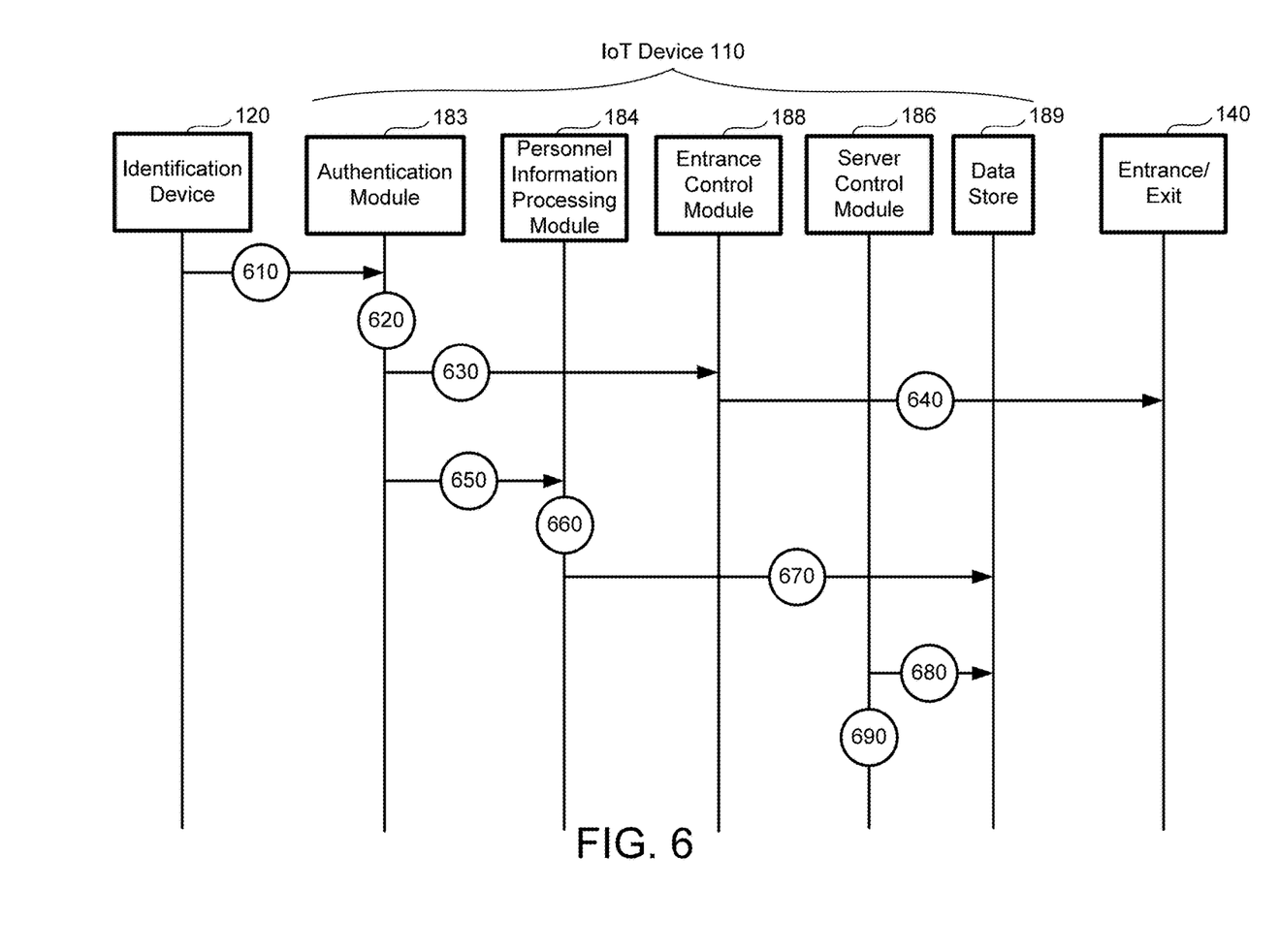
FIG. 6 depicts a flowchart showing a method for regulating illumination or temperature level in a designated area by an IoT device according to certain embodiments of the present disclosure.

A further aspect of the present disclosure is directed to a method for regulating illumination or temperature level in a designated area by an IoT device. FIG. 6 depicts a flowchart showing a method for regulating illumination or temperature level in a designated area by an IoT device according to certain embodiments of the present disclosure. In certain embodiments, the method as shown in FIG. 6 may be implemented on a system as shown in FIG. 1. It should be particularly noted that the sequence of the procedures as described in the flowchart as shown in FIG. 6 may vary, and is thus not intended to limit the disclosure thereof.

At procedure 610, the identification device 120 communicates with the IoT device 110 to send a communication signal to the IoT device 110. In certain embodiments, the communication signal includes authentication information of a user of the identification device 120. In certain embodiments, the IoT device 110 performs the action of detecting the identification device 120 and receives the communication signal. In certain embodiments, the identification device 120 performs the action of generating the communication signal and sending the signal to the IoT device 120.

At the IoT device 110, when the first network connection module 181 receives the communication signal, at procedure 620, the authentication module 183 performs the authentication process to determine, based on the authentication information, whether the identification device 120 is authenticated. In certain embodiments, the authentication module 183 may retrieve the authentication information from the communication signal, and then determine whether the identification device 120 is authenticated based on the authentication information. In certain embodiments, the authentication module 183 may compare the authentication information of the user of the identification device to the authentication data of each of the authenticated users stored in the data store 189. When the authentication information of the user of the identification device 120 matches one of the authentication data of each of the authenticated users, the authentication module 183 may determine the identification device 120 to be authenticated. If the authentication information of the user of the identification device 120 does not match any record of the authentication data, the authentication module 183 may determine that the identification device 120 is not authenticated.

At procedure 630, once the authentication module 183 determines the identification device 120 to be authenticated, the authentication module 183 may send information to activate the entrance control module 188. At procedure 640, the entrance control module 188 may control the entrance/exit 140 to grant access for the user of the identification device 120.

Meanwhile, at procedure 650, once the authentication module 183 determines the identification device 120 to be authenticated, the authentication module 183 may send information to activate the personnel information processing module 184. At procedure 660, the personnel information processing module 184 may generate the personnel access information of the user of the identification device 120 based on the information from the authentication module 183. At procedure 670, the personnel information processing module 184 then uses the personnel access information of the user to update the personnel information corresponding to the designated area, which is stored in the data store 189.

Once the personnel information in the data store 189 is updated, at procedure 680, the server control module 186 may access the data store 189 to retrieve the personnel information corresponding to the designated area and the lighting and temperature rules. At procedure 690, the server control module 186 may determine the corresponding lighting and temperature conditions of the designated area based on the personnel information and the lighting and temperature rules, and then generate control signals for the servers 170 to control the lighting and heating/cooling systems for the designated area. The second network connection module 182 may then transmit the control signals to the servers 170 through the network 130.

Figure 7:
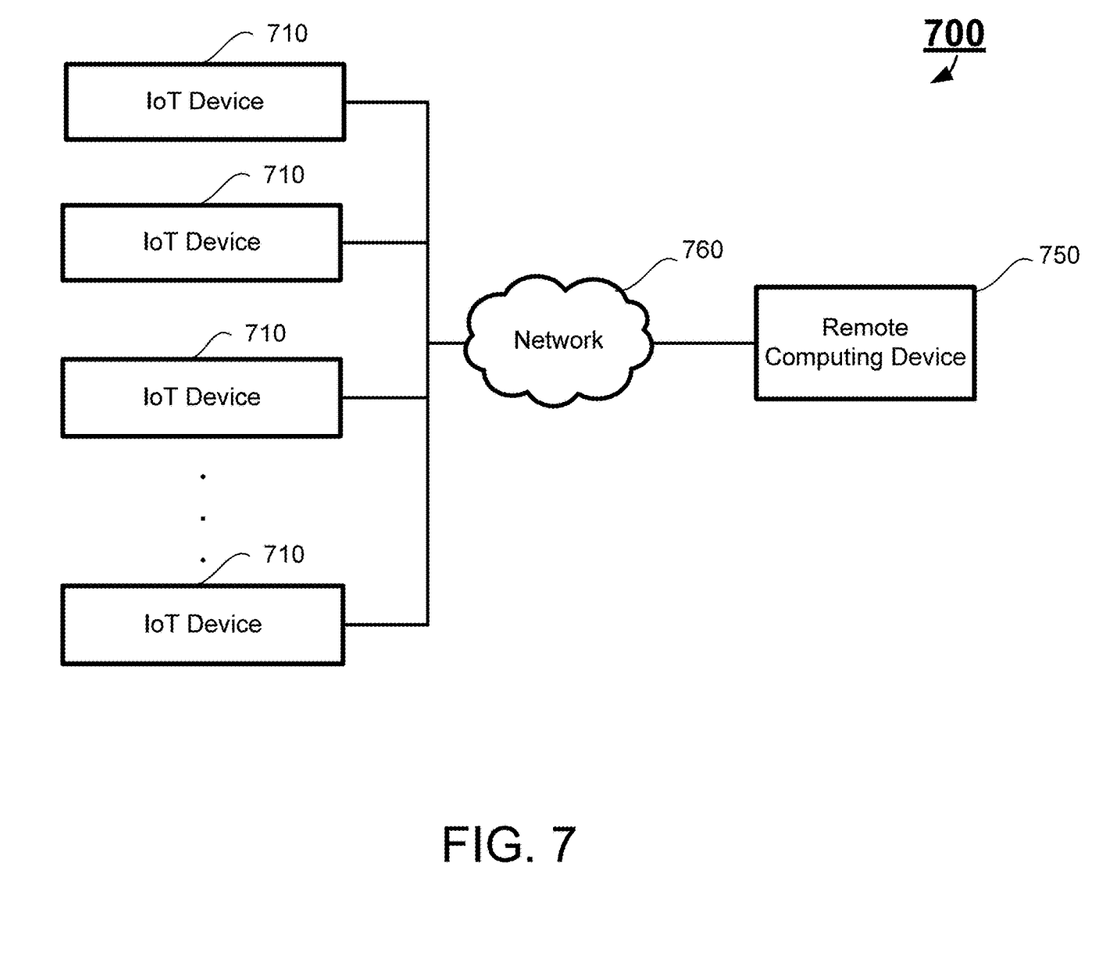
FIG. 7 schematically depicts an exemplary system having multiple IoT devices according to certain embodiments of the present disclosure.

In certain embodiments, the designated area may include multiple entrances or exits. In this case, each of the entrance/exit may be an IoT based entrance/exit, which has a corresponding IoT device 110. In this case, there is a need to control all of the IoT device 110 for all of the entrances/exits such that the personnel information stored in the data store 189 of each IoT device 110 may be identical. For example, FIG. 7 schematically depicts an exemplary system having multiple IoT devices according to certain embodiments of the present disclosure. Specifically, the system 700 as shown in FIG. 7 only shows the multiple IoT devices 710, a remote computing device 750, and the network 760 interconnecting the IoT devices 710 and the remote computing device 750. Other components of the system 700, such as the identification device(s), the wireless network, and the servers are not shown in FIG. 7. As shown in FIG. 7, the system 700 includes multiple IoT devices 710. Since each of the IoT devices 710 is communicatively connected to the remote computing device 750 through the network 760, the remote computing device 750 may function as a centralized server to collect all personnel information from all IoT devices 710, process the personnel information to obtain a synchronized personnel information, and send the synchronized personnel information back to each IoT devices 710 to ensure all data in each of the IoT devices 710 are synchronized.

In a further aspect, the present disclosure is related to a non-transitory computer readable medium storing computer executable code. The code, when executed at one or more processor, may perform the method as described above. In certain embodiments, the non-transitory computer readable medium may include, but not limited to, any physical or virtual storage media. In certain embodiments, the non-transitory computer readable medium may be implemented as the storage device 116 of the IoT device 110 as shown in FIG. 1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
   at least one internet of things (IoT) based entrance for a designated area, each of the at least one IoT based entrance comprising an IoT device, the IoT device comprising a processor and a storage device storing computer executable code, wherein the computer executable code, when executed at the processor, is configured to:
   establish correspondences between a plurality of users and a plurality of identification devices, wherein each of the users is assigned with a corresponding one of the identification devices, the users comprise a first user and a second user, and the identification devices comprise a first identification device assigned to the first user and a second identification device assigned to the second user;
   receive, from the first identification device through a wireless network, authentication information of the first user;
   determine, based on the authentication information of the first user, whether the first identification device is authenticated;
   in response to determining the first identification device to be authenticated,
      control the IoT based entrance to grant access to the first user;
      generate personnel access information of the first user, wherein the personnel access information of the first user comprises a first counter number indicating an authenticated access count of the first user through the IoT based entrance;
      update personnel information corresponding to the designated area using the personnel access information of the first user; and
      control a lighting system and a heating/cooling system based on the personnel information corresponding to the designated area and lighting and temperature rules; and
   determine a location of the first user by the first counter number, wherein when the first counter number is an odd number, the first user is determined to be located in the designated area; and when the first counter number is an even number, the first user is determined to be located out of the designated area;
   wherein personnel access information of the second user comprises a second counter number indicating an authenticated access count of the second user through the IoT based entrance, and the first counter number is counted independently and separately from the second counter number.

2. The system as claimed in claim 1, wherein the personnel information corresponding to the designated area comprises a total number of authenticated users physically located within the designated area.

3. The system as claimed in claim 2, wherein the personnel information corresponding to the designated area further comprises identity information of each of the authenticated users physically located within the designated area.

4. The system as claimed in claim 3, wherein the lighting and temperature rules comprise the preferred illumination level and preferred temperature level for each of the authenticated users.

5. The system as claimed in claim 4, wherein the computer executable code is configured to control the lighting system and the heating/cooling system by:
   retrieving the identity information of each of the authenticated users physically located within the designated area;
   retrieving, based on the identity information of each of the authenticated users, the preferred illumination level and preferred temperature level for each of the authenticated users; and
   calculating an overall illumination level and an overall temperature level for the designated area as the lighting and temperature rules.

6. The system as claimed in claim 1, further comprising at least one server to control the lighting system and the heating/cooling system, wherein the computer executable code is configured to control the lighting system and the heating/cooling system by:
   generating control signals based on the personnel information corresponding to the designated area and the lighting and temperature rules; and
   sending the control signals to the at least one server to control the lighting system and the heating/cooling system.

7. The system as claimed in claim 6, wherein the IoT device is communicatively connected to the at least one server through a network independent and separate from the wireless network.

8. The system as claimed in claim 6, wherein the computer executable code comprises:
   a data store storing the personnel information corresponding to the designated area and the lighting and temperature rules;
   an authentication module configured to determine, based on the authentication information of the first user, whether the first identification device is authenticated;
   an entrance control module configured to, when the first identification device is authenticated, control the IoT based entrance to grant access to the first user;
   a personnel information processing module configured to:
      when the first identification device is authenticated, generate the personnel access information of the first user; and
      update the personnel information corresponding to the designated area using the personnel access information of the first user; and
   a server control module configured to:
      retrieve the personnel information corresponding to the designated area and the lighting and temperature rules from the data store; and
      generate, based on the personnel information corresponding to the designated area and the lighting and temperature rules, control signals, and send the control signals to at least one server to control the lighting system and the heating/cooling system.

9. The system as claimed in claim 8, wherein the data store further stores authentication data of each of the authenticated users, and the authentication module is configured to:
receive, from the identification device through the wireless network, the authentication information of the first user;
compare the authentication information of the first user to the authentication data of each of the authenticated users; and
when the authentication information of the first user matches one of the authentication data of each of the authenticated users, determine the first identification device to be authenticated.

10. A method for regulating illumination and temperature levels in a designated area according to personnel composition, the method comprising:
establishing correspondences between a plurality of users and a plurality of identification devices, wherein each of the users is assigned with a corresponding one of the identification devices, the users comprise a first user and a second user, and the identification devices comprise a first identification device assigned to the first user and a second identification device assigned to the second user;
receiving, by an internet of things (IoT) device of at least one IoT based entrance for the designated area from the first identification device through a wireless network, authentication information of the first user;
determining, by the IoT device based on the authentication information of the first user, whether the first identification device is authenticated; and
in response to determining the first identification device to be authenticated,
controlling, by the IoT device, the IoT based entrance to grant access to the first user;
generating, by the IoT device, personnel access information of the first user, wherein the personnel access information of the first user comprises a first counter number indicating an authenticated access count of the first user through the IoT based entrance;
updating, by the IoT device, personnel information corresponding to the designated area using the personnel access information of the first user; and
controlling, by the IoT device, a lighting system and a heating/cooling system based on the personnel information corresponding to the designated area and lighting and temperature rules; and
determining, by the IoT device, a location of the first user by the first counter number, wherein when the first counter number is an odd number, the first user is determined to be located in the designated area; and when the first counter number is an even number, the first user is determined to be located out of the designated area;
wherein personnel access information of the second user comprises a second counter number indicating an authenticated access count of the second user through the IoT based entrance, and the first counter number is counted independently and separately from the second counter number.

11. The method as claimed in claim 10, wherein the personnel information corresponding to the designated area comprises a total number of authenticated users physically located within the designated area.

12. The method as claimed in claim 11, wherein the personnel information corresponding to the designated area further comprises identity information of each of the authenticated users physically located within the designated area, and the lighting and temperature rules comprise the preferred illumination level and preferred temperature level for each of the authenticated users.

13. The method as claimed in claim 12, wherein the IoT device is configured to control the lighting system and the heating/cooling system by:
retrieving the identity information of each of the authenticated users physically located within the designated area;
retrieving, based on the identity information of each of the authenticated users, the preferred illumination level and preferred temperature level for each of the authenticated users; and
calculating an overall illumination level and an overall temperature level for the designated area as the lighting and temperature rules.

14. The method as claimed in claim 10, wherein the IoT device is communicatively connected to at least one server to control the lighting system and the heating/cooling system, wherein the IoT device is configured to control the lighting system and the heating/cooling system by:
generating control signals based on the personnel information corresponding to the designated area and the lighting and temperature rules; and
sending the control signals to the at least one server to control the lighting system and the heating/cooling system.

15. The method as claimed in claim 14, wherein the IoT device is communicatively connected to the at least one server through a network independent and separate from the wireless network.

16. A non-transitory physical computer readable medium storing computer executable code, wherein the computer executable code, when executed at a processor of an internet of things (IoT) device of at least one IoT based entrance for a designated area, is configured to:
establish correspondences between a plurality of users and a plurality of identification devices, wherein each of the users is assigned with a corresponding one of the identification devices, the users comprise a first user and a second user, and the identification devices comprise a first identification device assigned to the first user and a second identification device assigned to the second user;
receive, from the first identification device through a wireless network, authentication information of the first user;
determine, based on the authentication information of the first user, whether the first identification device is authenticated;
in response to determining the first identification device to be authenticated,
control the IoT based entrance to grant access to the first user;
generate personnel access information of the first user, wherein the personnel access information of the first user comprises a first counter number indicating an authenticated access count of the first user through the IoT based entrance;
update personnel information corresponding to the designated area using the personnel access information of the first user; and
control a lighting system and a heating/cooling system based on the personnel information corresponding to the designated area and lighting and temperature rules; and determine a location of the first user by the first counter number, wherein when the first counter number is an odd number, the first user is determined to be located in the designated area; and when the first counter number is an even number, the first user is determined to be located out of the designated area;

wherein personnel access information of the second user comprises a second counter number indicating an authenticated access count of the second user through the IoT based entrance, and the first counter number is counted independently and separately from the second counter number.

17. The non-transitory physical computer readable medium as claimed in claim 16, wherein the personnel information corresponding to the designated area comprises a total number of authenticated users physically located within the designated area.

18. The non-transitory physical computer readable medium as claimed in claim 17, wherein the personnel information corresponding to the designated area further comprises identity information of each of the authenticated users physically located within the designated area, and the lighting and temperature rules comprise the preferred illumination level and preferred temperature level for each of the authenticated users.

19. The non-transitory physical computer readable medium as claimed in claim 18, wherein the computer executable code is configured to control the lighting system and the heating/cooling system by:
retrieving the identity information of each of the authenticated users physically located within the designated area;
retrieving, based on the identity information of each of the authenticated users, the preferred illumination level and preferred temperature level for each of the authenticated users; and
calculating an overall illumination level and an overall temperature level for the designated area as the lighting and temperature rules.

20. The non-transitory physical computer readable medium as claimed in claim 16, wherein the computer executable code is communicatively connected to at least one server to control the lighting system and the heating/cooling system, wherein the IoT device is configured to control the lighting system and the heating/cooling system by:
generating control signals based on the personnel information corresponding to the designated area and the lighting and temperature rules; and
sending the control signals to the at least one server to control the lighting system and the heating/cooling system.

21. The non-transitory physical computer readable medium as claimed in claim 20, wherein the IoT device is communicatively connected to the at least one server through a network independent and separate from the wireless network.

22. The non-transitory physical computer readable medium as claimed in claim 20, wherein the computer executable code comprises:
a data store storing the personnel information corresponding to the designated area and the lighting and temperature rules;
an authentication module configured to determine, based on the authentication information of the first user, whether the first identification device is authenticated;
an entrance control module configured to, when the first identification device is authenticated, control the IoT based entrance to grant access to the first user;
a personnel information processing module configured to:
when the first identification device is authenticated, generate the personnel access information of the first user; and
update the personnel information corresponding to the designated area using the personnel access information of the first user; and
a server control module configured to:
retrieve the personnel information corresponding to the designated area and the lighting and temperature rules from the data store; and
generate, based on the personnel information corresponding to the designated area and the lighting and temperature rules, control signals, and send the control signals to at least one server to control the lighting system and the heating/cooling system.

* * * * *